(12) United States Patent
Delaporte

(10) Patent No.: US 6,448,892 B1
(45) Date of Patent: Sep. 10, 2002

(54) RECEIVER FOR MONITORING VEHICLE TIRE PRESSURE AND ASSOCIATED TRANSMITTER FOR REMOTE CONTROL OF OTHER ELEMENTS OF THE VEHICLE

(75) Inventor: Francis Delaporte, Osny (FR)

(73) Assignee: Sagem SA, Paris (FR)

( * ) Notice: Subject to any disclaimer, the term of this patent is extended or adjusted under 35 U.S.C. 154(b) by 0 days.

(21) Appl. No.: 09/655,369

(22) Filed: Sep. 5, 2000

(30) Foreign Application Priority Data

Sep. 3, 1999 (FR) .............................. 99 11075

(51) Int. Cl.⁷ .............................. B60C 23/00
(52) U.S. Cl. .................. 340/442; 340/447; 340/825.69; 340/539; 73/146.2
(58) Field of Search ................ 340/442, 447, 340/445, 425, 426, 825.69, 825.72, 539, 517, 521; 73/146.2, 146.4, 146.5, 146.8

(56) References Cited

U.S. PATENT DOCUMENTS 5,500,637 A  *  3/1996  Kokubu ..................... 340/447

FOREIGN PATENT DOCUMENTS

| DE | 197 20 123 A1 | 7/1998 |
| EP | 0 671 289 A1 | 9/1995 |

OTHER PUBLICATIONS

Ronald K. Jurgen; "The Electronic Motorist"; Mar. 1, 1999; IEEE Spectrum, vol. 32, No. 3.

* cited by examiner

*Primary Examiner*—Daryl Pope
(74) *Attorney, Agent, or Firm*—Lowe Hauptman Gilman & Berner, LLP

(57) ABSTRACT

A receiver includes circuits (17) for wireless reception of pressure-signal frames configured so as to forward the frames to processing circuits (15) that also process frames representative of other signals and controlled in consequence by frame-discrimination circuits (12, 13, 14). A transmitter is also disclosed that includes circuits for controlling transmission of a frame header with a duration at least equal to that of the header of a tire-pressure monitoring TPMS frame.

5 Claims, 2 Drawing Sheets

RECEIVER FOR MONITORING VEHICLE TIRE PRESSURE AND ASSOCIATED TRANSMITTER FOR REMOTE CONTROL OF OTHER ELEMENTS OF THE VEHICLE

TECHNICAL FIELD

The present invention relates to the wireless transmissions for monitoring or actuating elements of a motor vehicle, in particular tire pressure, via pressure sensors housed in them and linked by radio to a receiver associated with an onboard computer. Likewise, door locks may be remotely controlled, from a portable transmitter, via a receiver in the vehicle controlling actuators of these locks.

BACKGROUND ART

These two receivers represent a certain volume of hardware and thus a certain cost since, in particular, they include consumption-reducing circuits so that, at least when the vehicle is at rest, these receivers do not discharge the battery of the vehicle too rapidly.

EP-671 289A teaches a receiver designed to receive a frame of defined format in which the value of a field specifies whether it is a pressure-measurement or a remote-control message.

DE-197 20 123A teaches an FM or AM demodulating multi-protocol receiver, without giving details on the transmission protocols.

SUMMARY OF THE INVENTION

The present invention aims to reduce the volume of radio hardware.

To that end, the invention first of all relates to a receiver for monitoring tire pressure of a motor vehicle, including means for wireless reception of pressure-signal frames configured so as to forward these frames to a processing means configured to also process frames of another type representative of other signals, and frame discrimination means are provided and configured to control in consequence the processing means.

Hence, the receiver is multifunctional and this avoids for multiple specific receivers for the frames of the other signals, serving, for example, for remote control of the door locks.

Advantageously, the receiving means are configured to pass alternately from a standby state to an alert state according to a predetermined cycle, and the discrimination means are configured to discriminate the frames by discrimination of two particular datatransmission frequencies in two respective headers of the frames, with durations at least equal to the cycle.

The receiver may thus pick up a transmission of a header of one or other of the frames when it is in the alert state, and the discrimination means can rapidly determine the processing which is suitable for the rest of the frame.

The invention also relates to a transmitter for wireless remote control of elements of a motor vehicle, for controlling the receiver of the invention, including wireless transmission means and means for control of the transmission means, which are configured to transmit via them a frame of remote-control bits, characterized in that the control means are configured to transmit a frame header with duration at least equal to that of the header of a tire-pressure monitoring TPMS frame.

BRIEF DESCRIPTION OF THE DRAWING

The invention will be better understood with the aid of the following description of a preferred embodiment of the pressuremonitoring receiver and of the associated remote-control transmitter of the invention, by reference to the attached drawing, in which.

BEST MODE FOR CARRYING OUT THE INVENTION

Figure 1:
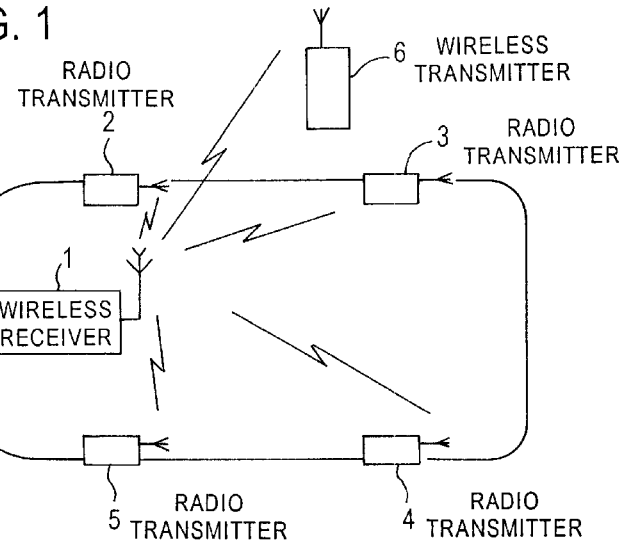
FIG. 1 is a diagrammatic representation of a motor vehicle equipped with the receiver of the invention.

The motor vehicle in top view in FIG. 1 is equipped with a wireless receiver 1, here radio, of pressure-signal frames 50 (FIG. 4B), originating from pressure sensors associated with radio transmitters 2, 3, 4, 5 housed in the respective tires of the vehicle.

The receiver 1 is designed, moreover, to receive frames 70 (FIG. 4C) of a type or format other than that of the frames 50 for other, remote-control, signals, originating from a portable wireless transmitter 6, here therefore radio, for remote control of elements of the vehicle, here the door locks.

The transmitter 6, or electronic key, includes a timebase circuit 60 which controls the sequencing of a microprocessor 61 linked to a memory 62 containing two frames, of the same format 70, of remote-control signals, and controlled by two buttons 66 and 67 for, respectively, locking and unlocking the door locks of the vehicle. The microprocessor 61, via a radio transmitter circuit 63, controls the transmission of the frames 70 from the memory 62 the header 71 of which has a duration at least equal to that of a header 51 of a frame 50. This duration is fixed by the number of bits of the header 51, here forming a sequence of 0 and 1 which alternate regularly so as to allow the receiver 1 to synchronize itself (synchronization bit) upon reception of this header 71.

In a variant, provision may be made for repeated transmission of a pair of 0 and 1 bits in memory 62, the total duration of which would be fixed by a sent-bit counter associated with a comparator. The comparator, referenced to a defined number of bits to be sent, would cause transmission to pass to the following field 72 whet the desired number of bits is reached, sent at a defined speed and thus representing the intended header 71 duration. A battery 65 powers the assembly.

Figure 2:
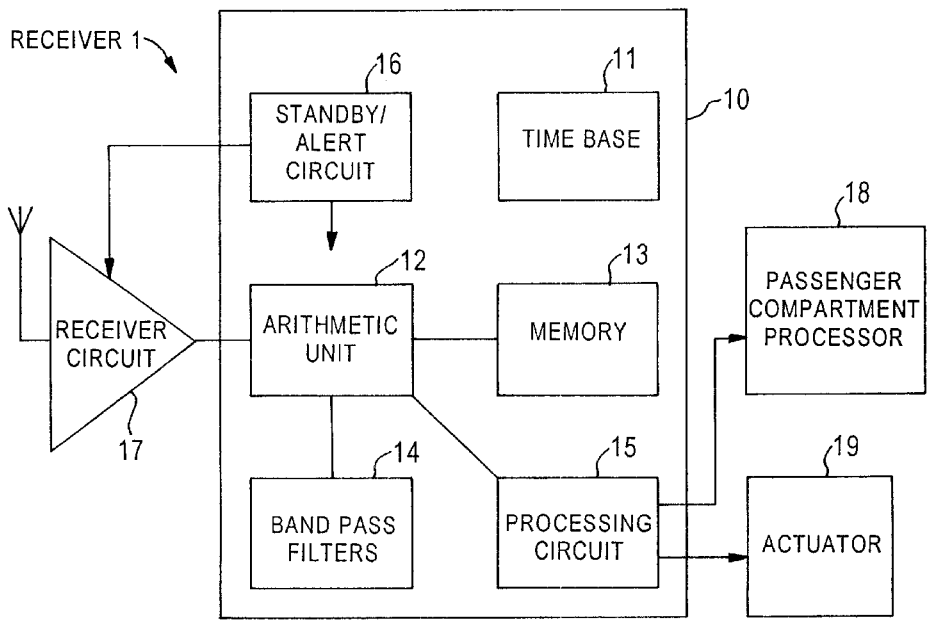
FIG. 2 is a functional block diagram of the receiver.
Figure 3:
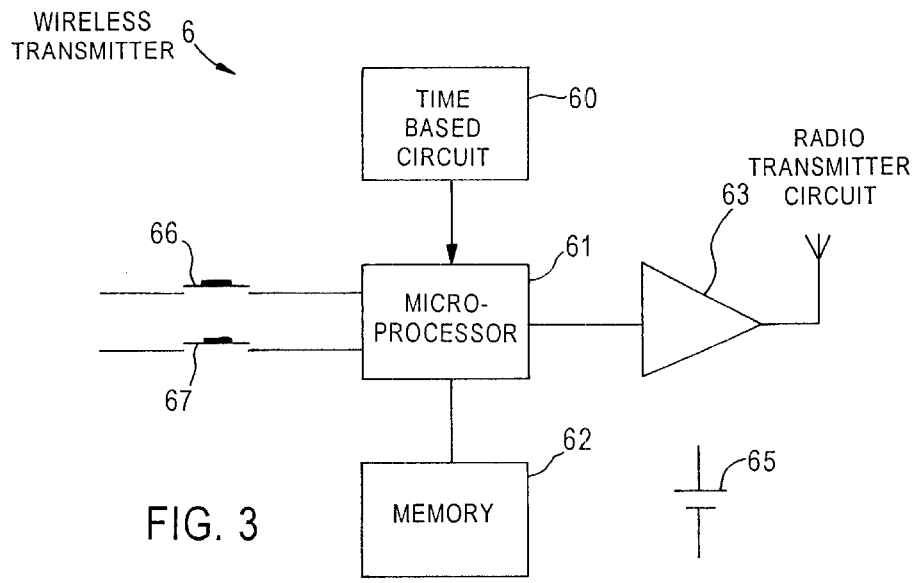
FIG. 3 is a functional block diagram of a portable transmitter for remote control, via the receiver, of door locks of the vehicle, and FIG. 4, formed by FIGS. 4A, 4B and 4C, represent, respectively, as a function of time t, a frame-sampling signal and two different frames of radio signals received and sampled by the receiver.

The receiver 1 of FIG. 2 includes, at the head end, a demodulating radio receiver circuit 17, with a single antenna, linked at its output to a central processing unit or microprocessor 10 which includes a timebase 11 and an arithmetic unit 12 for discriminating formats 50, 70 of the received frames, which is associated with a memory 13 for tyre-pressure remote monitoring signal frames 50 and for remote-control signal frames 70 from the transmitter 6. A pair of bandpass filters 14, in parallel, is provided here and associated with the arithmetic unit 12. Moreover, the microprocessor 10 includes circuits 15 for processing or interpreting the signals of the frames 50, 70 received, and a standby and alert circuit 16 controlling the receiver circuit 17 and the rest of the circuits, except the timebase 11, of the microprocessor 10. The latter controls a passenger-compartment computer or processor 18 for signaling tyre pressure and an actuator 19 for control of the door locks of the vehicle. The microprocessor 10 here is of CMOS technology and the circuit 16 sets the rest of the circuits to standby simply by blocking clock circuits which cause them to operate, originating from the timebase 11. The receiver circuit 17 for its part is placed on standby by having its power supply cut off.

Figure 4A:
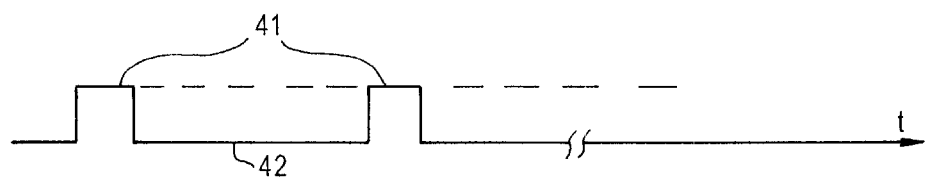

FIG. 4A represents a signal for inhibition or standby/alert control, output by the standby and alert circuit 16. It exhibits a cyclic profile, with a low state lasting 20 milliseconds which forces the circuits above into the standby state and a high state, lasting 5 ms in which the receiver 1 is in the alert state and thus completely functional for receiving the frames 50, 70 and interpreting them.

In the standby state, the consumption by the receiver 1 is very much limited, so that the average consumption over each 25 ms cycle is only 20% of the consumption in the alert state.

Figure 4B:
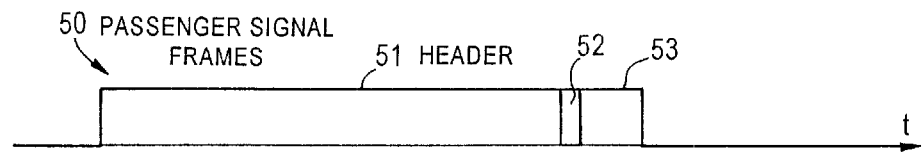

FIG. 4B represents the pressure-telemetry signal frame 50. The frame 50 is to the standard of the TPMS frame of tyre-pressure monitoring systems, is transmitted by modulation of a carrier frequency modulated at 9600 b/s and lasts 35.75 ms. It includes the header field 51 for alerting the receiver 1, lasting 30 ms, followed by a field 52 for logic synchronization of the receiver 1, lasting 0.75 ms, and by a field 53 of 48 bits of useful data, lasting 5 ms.

Figure 4C:
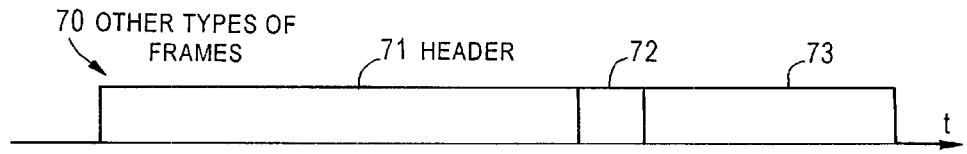

The format of the frames 70 transmitted by the transmitter 6 and represented in FIG. 4C is similar overall to that of the frames 50, but with different field sizes. The frames 70, themselves also transmitted by the radio circuit 63 by frequency modulation of a carrier, are sent in this example with a different modulation speed from that of the frames 50, here 4 kb/s. A frame 70 includes the header field 71 for alerting the receiver 1, of 32 ms, followed by a logic-synchronization field 72 of 6.6 ms, including 26 bits, and by a field 73 of useful data of 22.5 ms, including 88 useful bits. The type of a frame may therefore characterize the formats of its fields just as much as the type and the speed of modulation for sending it.

The operation of the transmitters 2 to 5, of the transmitter 6 and of the receiver 1 will now be explained in more detail.

The receiver 1 is on standby over a major part (42) of the cycle of FIG. 4A, and the window 41 for sampling or polling of the radio transmissions from the transmitters 2 to 6 is open cyclically for detecting the presence of a radio signal on the antenna of the receiver circuit 17. The radio receiver circuit 17 and the microprocessor 10 pass alternately from the standby state to the alert state according to the predetermined cycle 41, 42 of the circuit 16. In the alert state, and in the event of reception of a frame 50 or 70, the arithmetic unit 12, with the memory 13 and the filters 14, will discriminate the two particular types of frames 50, 70 by discrimination between the two particular data-transmission frequencies in the two respective headers 51, 71 of the frames 50, 70, headers with durations at least equal to the polling cycle 41, 42. The received signal from the single antenna is forwarded, demodulated, to the arithmetic unit 12, which includes a signal processor here having an analogue/digital converter at its head end. The arithmetic unit 12 then carries out a simple detection of the level received (presence of 0 and/or 1 bits), by means of a digital integrator of the signal controlling a comparator referenced to a defined threshold. In the absence of a crossing of the threshold during the window 41, the standby and alert circuit 16 carries on with its cycle and passes back to the low, standby state 42.

In contrast, if the processor of the signal from the arithmetic unit 12 detects a crossing of the threshold by the received level, the arithmetic unit 12 blocks the change in the state of the circuit 16, in the high state, so as to keep the receiver 1 in the alert state (dashed line of FIG. 4A).

As the frames 50 and 70 have a header 51, 71 duration at least equal to that of the 25 ms cycle of the circuit 16, a part of the header 51, 71 transmitted is received with certainty by the arithmetic unit 12. Here, the headers 51, 71 actually have a duration of at least one cycle 41, 42 plus the duration of a window 41, so that a window 41 is always entirely accommodated, in terms of time, in every header 51, 71 received. This facilitates the level detection by integration over the entire duration of the window 41, by thus filtering the noise over this entire duration.

Upon reception of the header 51, 71, the arithmetic unit 12 synchronizes itself to the modulation of the bits received from the receiver circuit 17, so as to be immediately able to read or sample the bits of the following fields. This bit synchronization being thus acquired on reception, the following field 52, 72 serves to carry out logic synchronization, or frame synchronization, so as then to read all the bits of the useful field 53, 73, and only them, and to extract them from the frame 50, 70 so as to interpret them. This is because the above windowing principle prohibits the start instant of the header 51, 71 being detected, and it is therefore necessary to key the receiver 1 logically to the useful field 53, 73. To that end, the field 52, 72 contains a frame-synchronization data pattern, specific to the frame 50, 70 in question, which is also in memory 13 and which the arithmetic unit 12 searches for in the bitstream originating from the receiver circuit 17.

Hence, as soon as the arithmetic unit 12 has detected a reception level exceeding the threshold, it determines the speed of modulation of the received bits, by means of two filters 14, tuned respectively to the two modulation frequencies at 4000 and 9600 b/s, and deduces therefrom the identity of the frame 50 or 70 received. The arithmetic unit 12 will then read, from memory 13, the corresponding particular synchronization pattern 52 or 72 and compares it with the bitstream received from the receiver circuit 17. This stream advances, at each bit period, by one position in a shift register with parallel outputs linked to first parallel inputs of a comparator, second parallel inputs of which are linked to the memory 13 and, more specifically, to its pattern field 42 or 72. The pattern of the field 52 or 72 of the received stream is thus recognized when it passes into a defined position of the shift register and the following bits are thus identified as being the useful field 53 or 73, in order to be extracted and forwarded to the interpretation or processing circuits 15 so as to interpret them according to the application in question, of pressure monitoring or of remote control of locks.

As indicated above, the corresponding fields of the two frames 50, 70, are of different sizes and the filters 14 make it possible to discriminate the two frames 50, 70 in advance according to their headers 51, 71 so as to search for the pattern 52, 72 which is appropriate and then to extract all the bits of the associated useful field 53, 73. A telemetry field 53 received is forwarded, possibly after re-formatting in the processing circuits 15, to the processor 18, which analyses it in order to display an alarm, if appropriate. If it is a remote-control field 73 which is received, the processing circuits 15 analyse its content so as to control the actuator 19 in order to carry out locking or unlocking of the locks. The processor 18, in a variant, could form a single assembly with the processing circuits 15 and be integrated into the microprocessor 10.

In a variant, and, in particular, in the case in which the carriers of the two frames 50, 70 might be modulated at the same speed or frequency, provision could be made to discriminate the frames 50, 70 only at the level of the synchronization fields 52, 72.

In such a case, the filters 14 would be omitted and the arithmetic unit 12 would then carry out two comparisons in parallel, in order to search for the two fields 52 and 72 in the incoming stream and then to determine from them the frame type 50 or 70 received and thus the position of the useful field 53, 73 to be extracted and interpreted.

What is claimed is:

1. A receiver for monitoring tire pressure of tires of a motor vehicle, including receiving means (17) for wireless reception of pressure-signal frames (50) configured so as to forward said frames to a processing means (15) configured to also process frames (70) representative of another type of signal, and frame-discrimination means (12, 13, 14) are provided which are configured to control in consequence the processing means (15), wherein the receiving means (17) are configured to pass alternately from a standby state to an alert state according to a predetermined cycle (41, 42), and the discrimination means (12, 13, 14) are configured to discriminate between the two particular types of frames (50, 70) by discrimination between two particular data-transmission frequencies in two respective headers (51, 71) of the frames (50, 70), with durations at least equal to the cycle (41, 42).

2. The receiver according to claim 1, in which the discrimination means (12, 13, 14) are configured to recognize, in the received frames (50, 70), two data patterns (52, 72) particular to each type of frame (50, 70).

3. A transmitter for wireless remote control of elements of a motor vehicle, for controlling the receiver of claim 1, including wireless transmission means (63) and means (61, 62) for control of the transmission means (63), which are configured to transmit via them a frame (70) of remote-control bits, characterized in that the control means (61, 62) are configured to transmit a frame header (71) with duration at least equal to that of the header (51) of a tire-pressure monitoring TPMS frame.

4. The transmitter according to claim 3, in which the transmission means (63) include a radio transmitter with frequency-modulated carrier.

5. The transmitter according to claim 3, for remote control of door locks of the vehicle.

* * * * *